United States Patent
Yoshida et al.

(10) Patent No.: US 7,440,822 B2
(45) Date of Patent: Oct. 21, 2008

(54) INFORMATION PROVIDING SYSTEM, INFORMATION PROVIDING METHOD, AND COMPUTER PROGRAM

(75) Inventors: Jun Yoshida, Tokyo (JP); Yoichiro Koike, Tokyo (JP); Ken Sasagawa, Tokyo (JP); Yoshinaga Takikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1009 days.

(21) Appl. No.: 10/762,745

(22) Filed: Jan. 22, 2004

(65) Prior Publication Data

US 2004/0215727 A1    Oct. 28, 2004

(30) Foreign Application Priority Data

Jan. 23, 2003  (JP) .............................. 2003-014246

(51) Int. Cl.
*G06F 15/16* (2006.01)
(52) U.S. Cl. .......................................... 701/1; 709/206
(58) Field of Classification Search ................. 701/1; 709/206
See application file for complete search history.

(56) References Cited

U.S. PATENT DOCUMENTS 6,754,485 B1    6/2004   Obradovich et al.

FOREIGN PATENT DOCUMENTS

| JP | 11-272640   | 10/1999 |
| JP | 2001-255160 | 9/2001  |
| JP | 2001-264078 | 9/2001  |
| JP | 2002-132645 | 5/2002  |
| JP | 2002-133590 | 5/2002  |
| JP | 2002-215534 | 8/2002  |
| JP | 2002-251432 | 9/2002  |
| JP | 2002-277256 | 9/2002  |
| JP | 2003-514407 | 4/2003  |

OTHER PUBLICATIONS

"Automobiles and world: world car production, sales, and possession", Japan Automobile Manufacturers Association, Inc., retrieved on Oct. 31,2002, Internet URL: http://www.jama.or.jp/world/world/world_1.html.

*Primary Examiner*—Yonel Beaulieu
(74) *Attorney, Agent, or Firm*—Finnegan, Henderson, Farabow, Garrett & Dunner, L.L.P.

(57) ABSTRACT

A mail address of an automobile is obtained. The automobile is anthropomorphized as a friend of a driver by an AI function. The anthropomorphized automobile transmits a mail to the driver. Various types of information are automatically collected during driving of the automobile. With the collected information, a drive diary is generated. The drive diary is processed on a Web. An original homepage is generated with the processed drive diary. There is provided an service in which the automobile and a home, office or the like of the driver is connected through the homepage for user's enjoyment.

25 Claims, 12 Drawing Sheets

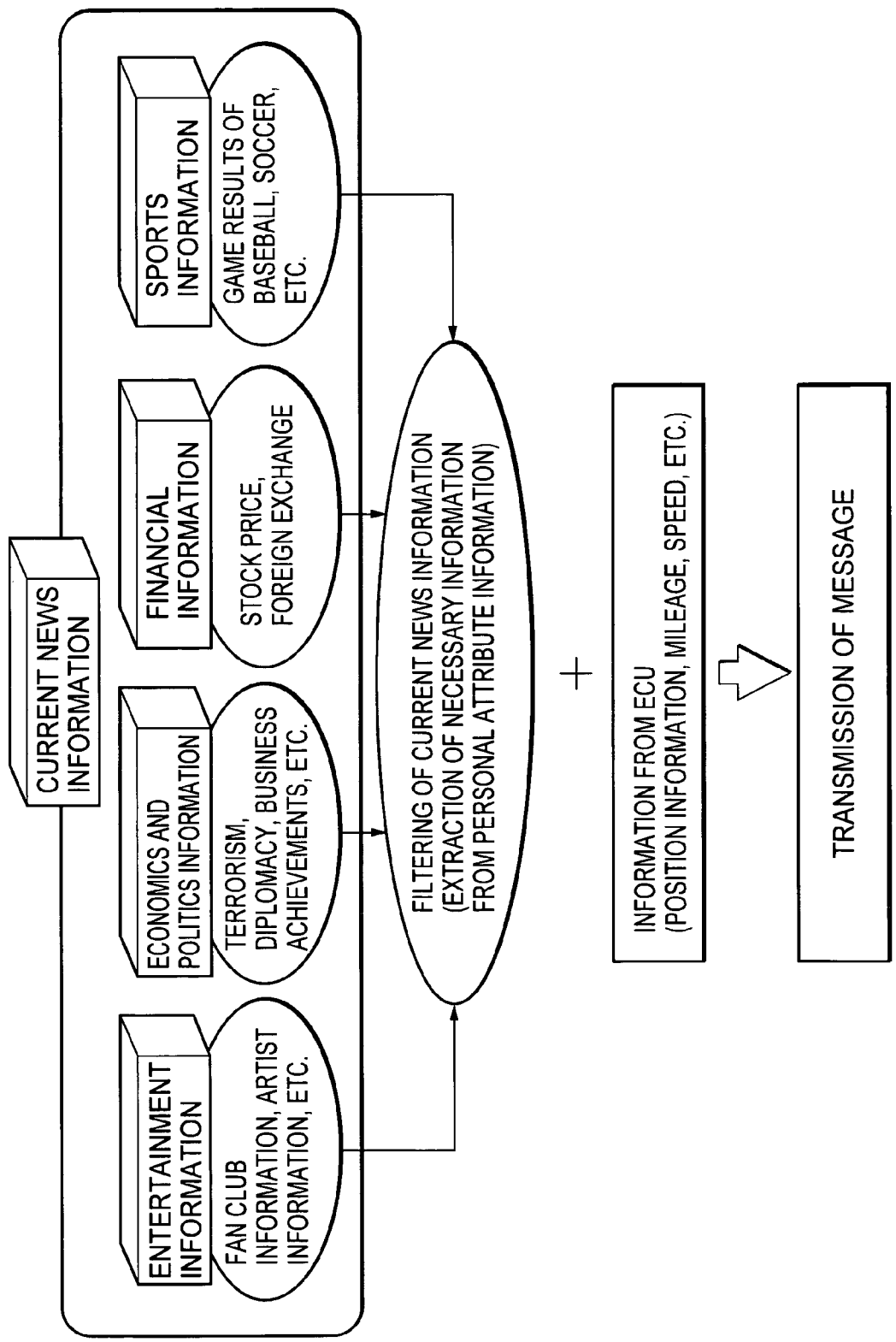

INFORMATION PROVIDING SYSTEM, INFORMATION PROVIDING METHOD, AND COMPUTER PROGRAM

CROSS REFERENCES TO RELATED APPLICATIONS

The present invention claims priority to its priority document No. 2003-014246 filed in the Japanese Patent Office on Jan. 23, 2003, the entire contents of which being incorporated by reference herein.

BACKGROUND OF THE INVENTION

1. Field of the Invention

The present invention relates to an information providing system, an information providing method and a computer program for providing information to a driver of an automobile and so forth. Specifically, the present invention relates to an information providing system, an information providing method and a computer program that enables an automobile to provide information to its driver, its passenger, or another user (in the following description, they may be referred to as simply the user).

2. Description of the Related Art

The motorization began long time ago in various countries of the world. As of the end of year 2000, the number of four-wheel motor automobiles in the world is about 748,710,000 units. It means that 124 automobiles per thousand persons, or, one automobile for every 8 persons. Of major countries having the largest number of four wheel automobiles, the United States, with 221,470,000 automobiles, accounts for about 30% of the total number of automobiles worldwide. Japan stands in the second place, with 72,650,000 automobiles, accounts for about 10% in use worldwide. Next, in European countries, German, Italy, France, and Britain follow. In Asian countries, China, Korea, India, etc have the increasing number of automobiles.

The motor automobile industry in Japan could be said one of the most comprehensive industries that have extensive related industries in various fields such as manufacturing, sales, resources, utilizations and the like. Population of the workers who are directly and indirectly engaged in these industries relating to the automobiles reaches to about 15 5,370,000 persons according to the estimation of the Japan Automobile Manufacturers Association, Inc. This amounts to about 8.4% of all the employment population in Japan (for example, "Automobiles and world: world car production, sales, and possession", Japan Automobile Manufacturers Association, Inc.,).

Quality of automobiles have been promoted as a penetration rate of automobiles has been increased and technologies thereof have been improved. Accordingly, more effective production techniques and measures for resolving issues such as pollution, safety, energy saving and the like have been actively researched. In addition, recently, higher added value has been demanded for automobile-related products. In addition to the main body of automobile, various driving assisting technologies supporting drivers have been widely researched and developed.

Further, recently, as information devices such as personal computers have become common and network technologies such as LAN and Internet have advanced, the users can receive benefits from information exchange such as electronic mail, information retrieval, information sharing and so forth. In addition, as entering a broadband era, more and more users have full-time access to the internet and various types of content services are introduced.

Furthermore, with introduction of mobilized information devices (mobile communication technologies), it becomes possible to perform a voice communication using an automobile telephone and access the Internet from the automobile.

In the field of automobiles, information technologies (IT) and intelligent systems have been applied for automobiles. For example, an onboard information terminal such as a car navigation system is capable of assisting a driver by providing information such as a route guidance.

In addition, recently, in order to improve an interior environment in the automobiles, information technology have been utilized. For example, there is a technology for generating an anthropomorphized agent and using it to convey various information to the driver. The agent is capable of learning responses or reactions of the driver to adjust its style and clothing so as to become a unique agent of the driver, whereby making the driving condition to be more comfortable (For example, see Japanese Patent Application Publication JP H11-272640).

The agent device installed in an automobile is capable of displaying human's face expressions and movements on a display monitor so as to provide information for the driver in a manner that he or she can easily understand information. Although this type of agent device is capable of communicating with the driver and other passengers within the automobile, the device is not capable of providing services to them after they get off the automobile.

SUMMARY OF THE INVENTION

It is desirable to provide an information providing system, information providing method, and computer program that enables an automobile to provide information to a driver, a passenger, or, another user.

Further, it is desirable to provide an information providing system, information providing method, and computer program that enables an automobile to provide information to a user and to anthropomorphize the automobile.

Still further, it is desirable to provide an information providing system, information providing method, and computer program that enables processing of information obtained in an automobile and transmitting of processed information to a driver.

According to an embodiment of the present invention, there is provided an information providing system, an information providing method, and/or a computer program for enabling an automobile to provide information for a user. More specifically, according to an embodiment of the present invention, there is provided an information providing system, information providing method and/or computer program that enables processing of information obtained in the automobile, distributing the processed information as a friend of a driver.

According to an embodiment of the present invention, there is provided an information providing system or information providing method for providing information to a user, including:

means or a step for obtaining information regarding a vehicle and its driving from the vehicle;

an information generating database having information to be used as templates and an information generating rule;

operation means or step for generating information to be provided in accordance with the information generating rule; and output means or step for outputting the information to be provided, which is generated by the operation means or step, wherein the operation means or step generates the information to be provided by using the information regarding a vehicle and its driving and the template information based on the information generating rule at a predetermined timing, and outputs the generated information.

In the present specification, the "system" means an entity including a plurality of apparatuses and/or devices (or functional modules that accomplish respective predetermined functions), which are logically combined. The individual apparatus or device or functional module may be installed together in a single housing. Alternatively, all or a part of the apparatuses and/or devices may be installed in different housings.

The operation means or step generates information to be provided such as an electronic mail using the information regarding the automobile and its driving and the template information in accordance with the information generating rule, for example, by utilizing an AI function.

In an information providing system or information providing method according to an embodiment of the present invention, the automobile is anthropomorphized by the AI function. These automobiles are assigned with respective community's accounts (mail addresses). In other words, the automobile obtains a mail address unique to the automobile. The automobile is anthropomorphized by the AI function as a friend of the driver. The automobile automatically transmits information that is for example in a mail form to the driver.

Furthermore, the AI server 14 may communicate with mail software of the automobile periodically, collect automobile (ECU) information, process the corrected information, generate transmission data in form of mail, and may send a electronic mail with a character essence. In addition, the AI server 14 may select information in accordance with user's hobby and preference, and send the selected information. In this manner, the AI server 14 may automatically distribute a report describing driving status of the automobile along with current news information that would attract him or her. Further, the AI server 14 may analyze characteristics of driving of the driver and warn him or her with the analyzed result.

When the information to be provided is in form of electronic mail, the destination thereof may include mail addresses of the driver of the automobile, other users thereof, and other automobiles. In this case, the information providing system may further include input means for inputting a mail address as a destination of an mail, and a mail address storage memory for storing the inputted mail address. Further, the electronic mail transmitting means may transmit the generated text information to a mail address that is stored in the mail address storage memory.

An information providing system may be configured to generate information to be provided such as an electronic mail in accordance with an attribute of the user such as the driver. More specifically, the information providing system may further include means for inputting user attribute information, a user attribute information storing memory for storing the inputted user attribute information, and read out means for reading out user attribute information from the user attribute information storing memory. Further, the operation means may generate the text information by using the user attribute information read out from the user attribute information storing memory, the information regarding a vehicle and its driving and the text information to be used as templates in accordance with the text information generating rule at a predetermined timing.

Further, an information providing system may be configured to obtain current news information and use the obtained current news information to generate information to be provided such as an electronic mail. More specifically, the information providing system may further include means for inputting a keyword for a current news information retrieval, a current news information retrieval keyword storing memory for storing the inputted current news information retrieval keyword, read out means for reading out the current news information retrieval keyword from the current news information retrieval keyword storing memory, and means for obtaining current news information, at a predetermined timing, using the current news information retrieval keyword that is read out by the read out means. Further, the operation means may generates the text information by using the obtained current news information, the information regarding a vehicle and its driving and the text information to be used as templates in accordance with the text information generating rule at a predetermined timing.

Further, an information providing system may be configured to generate information to be provided such as an electronic mail in accordance with a relation of a current position of the automobile and a destination such as home, workplace, and the like. More specifically, the information providing system may further include a first storing memory for storing a current position information of the vehicle received from a vehicle position display device at least at a predetermined timing, means for inputting predetermined position information, and a second storing memory for storing the position information inputted. The operation means may generate the text information by using the position information read out from the first storing memory, the position information read out from the second storing memory, the information regarding a vehicle and its driving and the text information to be used as templates in accordance with the text information generating rule at a predetermined timing.

Further, an information providing system may be configured to automatically collect various types of information obtained during driving, generate a drive diary, process the generated drive diary on the Web to generate an original homepage, and connect the automobile and a home and office of the user through the homepage, whereby providing an enjoyable service.

More specifically, the information providing system may further include means for obtaining information regarding a vehicle and its driving from the vehicle, an information generating database having text information to be used as templates and a text information generating rule, operation means for generating text information in accordance with the text information generating rule, and means for publishing the text information, which is generated by the operation means, at a predetermined address on the information retrieval space through a network. Further, the operation means may generate the text information by using the information regarding a vehicle and its driving and the text information to be used as templates in accordance with the text information generating rule at a predetermined timing, and the information publishing means may publish the generated text information at the predetermined address on the information retrieval space.

When the drive diary is published on the Web in that manner, it may be generated in accordance with the relation between the current position of the automobile and the destination such as home and workplace of the user.

Further, the drive diary with pictures may be provided by utilizing pictures captured during traveling of the automobile and the like if necessary. In this case, the information providing system may further include a text and picture information generating database having a text and picture information generating rule for combining text information and picture information so as to generate homepage picture information, means for capturing a picture at a predetermined timing, and a storing memory for storing the captured picture. Further, the operation means may generate the homepage picture information as the drive diary by using the picture information read out from the storing memory, the information regarding a vehicle and its driving and the text information to be used as templates in accordance with the text and picture information generating rule at a predetermined timing.

According to another embodiment of the present invention, there is provided a computer readable program for causing a computer system to execute processing for allowing the automobile to provide information to a user. The program may include:

a step for obtaining information regarding a vehicle and its driving from the vehicle;

a step for providing an information generating database having information to be used as templates and an information generating rule;

an operation step for generating information to be provided in accordance with the information generating rule; and an information output step for outputting the information to be provided, which is generated by the operation step, wherein, in the operation step, the information to be provided is generated by using the information regarding a vehicle and its driving and the template information based on the information generating rule at a predetermined timing, and the generated information to be provided is outputted by the information output step.

The computer readable program according to the another embodiment of the present invention defines a computer program written in a computer readable format for realizing a predetermined processing on a computer system. In other words, when the computer readable program according to the another embodiment of the present invention is installed in the computer system, and causing it to operate cooperatively so as to achieve similar operations and effects as the information providing system or information providing method according to the previous embodiments of the present invention.

As described above, according to the embodiments of the present invention, there may be provided an information providing system, information providing method and/or computer program that enables an automobile to provide information to a driver, a passenger or another user.

Further, according to the embodiments of the present invention, there may be provided an information providing system, information providing method and/or computer program that enables an automobile to provide information to a user and to anthropomorphize the automobile.

Still further, according to the embodiments of the present invention, there may be provided an information providing system, information providing method and/or computer program that enables processing of information obtained in an automobile and transmitting of processed information to a driver.

BRIEF DESCRIPTION OF THE DRAWINGS

These and other objects, features and advantages of the present invention will become more apparent in light of the following detailed description of a best mode embodiment thereof, as illustrated in the accompanying drawings:

FIG. 12 is a flow chart showing processing procedure by which AI server 14 generates an anthropomorphized mail for automatic transmission using current news information.

DETAILED DESCRIPTION OF THE EMBODIMENTS

Embodiments according to the present invention will be described with reference to the drawings.

As the Internet has become common and the broadband era has started, cooperative operations such as sharing of computer resources, and sharing, circulation, distribution, exchange and so forth of information have been performed more smoothly under a modern network connection environment.

For example, with an information retrieving system such as World Wide Web (WWW), content retrieving and delivering services in wide area have been promoted. In addition, contents to be provided may be subjected to processing (processed) in accordance with an attribute and like of a requesting client. Furthermore, the following service is being provided. In this service, an online community is virtually structured on the Internet. By logging in such a community, a user may perform his/her virtual social activities such as communication.

Nowadays, fulltime network connection is becoming more common. In view of a situation in which an increasing number of users are accessing the Internet from movable objects such as automobile (mobile environment), the present invention is made. According to an embodiment of the present invention, there is provided a highly entertaining service that enables to connect a driver and an automobile through the Internet.

More specifically, a unique mail address is assigned to an automobile. The automobile is anthropomorphized as a friend of the driver by means of an AI function, and automatically transmit a mail to the driver. In addition, various types of information are automatically collected during driving to generate a drive diary. Furthermore, the drive library is processed on a Web to generate an original homepage. By connecting the automobile and a home or office or the like of the user in this way, an enjoyable service may be provided.

Figure 1:
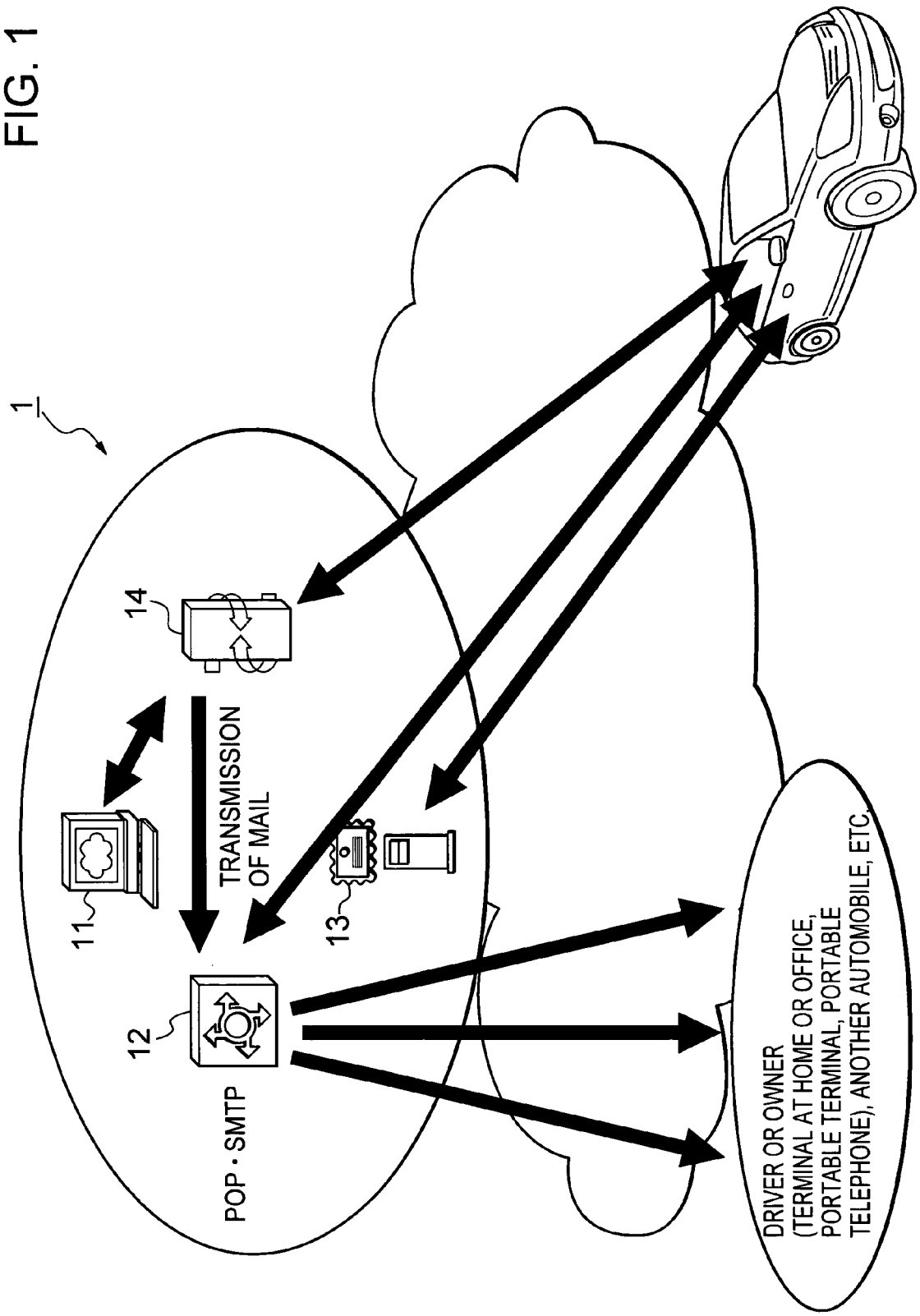
FIG. 1 is a schematic diagram showing a conceptual structure of an information providing system according to a first embodiment of the present invention.

FIG. 1 schematically shows a conceptual structure of an information providing system 1 according to the first embodiment of the present invention. As shown in FIG. 1, the information providing system 1 includes a community server 11, a mail server 12, an authenticating server 13 and an AI server 14, which are structured in a wide area network like the Internet. In addition to these servers, various hosts such as content providing servers may also exist on the wide area network. Various services are exchanged between the servers. For example, as one of such services, the server may provide contents.

The community server 11 establishes a virtual community on the wide area network and provides space for virtual society activities to users who logged in the virtual community. In the information providing system according to the embodiment, an automobile is anthropomorphized by the AI function. The community server 11 assigns a community's account (a mail address) to each of the anthropomorphized automobiles.

The mail server 12 is installed with Post Office Protocol (POP) and Simple Mail Transfer Protocol (SMTP), and provides a mail transmission and reception service through the community.

In the embodiment, since the mail address is also assigned to the automobile, a mail maybe exchanged between automobiles that become members of the community, between the automobile and its driver (owner), or between the automobile and another user.

When a user, an anthropomorphized automobile, or the like tries to log on the community or access it in another manner, the authenticating server 13 performs an authenticating process for the user or the anthropomorphized automobile. Since the authenticating process does not directly relate to the scope of the present invention, the description will be omitted in this specification.

The AI server 14 performs a process for anthropomorphizing an automobile using an artificial intelligence (AI) function. In other words, an automobile anthropomorphized by the AI function as a friend of a driver automatically transmits a mail to the driver. In addition, the AI server 14 may communicate with mail software of the automobile periodically or at a predetermined timing, collect automobile (ECU) information, process the corrected information, generate transmission data in form of mail, and may send a electronic mail with a character essence. In addition, the AI server 14 may select information in accordance with user's hobby and preference, and send the selected information. In this manner, the AI server 14 may automatically distribute a report describing driving status of the automobile along with current news information that would attract him or her. In addition, the AI server 14 may analyze characteristics of driving of the driver and warn him or her with the analyzed result.

Destinations of such a electronic mail may include mail addresses of the driver of the automobile, other users, and other automobiles.

In addition, the electronic mail may be generated in accordance with an attribute of a user or a driver. In other words, the AI server 14 receives and stores inputs of attribute information of the user. Further, the AI server 14, which is provided with text information generation rules, retrieves the attribute information of the user at a predetermined timing, and automatically generates the main text of an electronic mail by utilizing ECU information regarding the automobile and its driving or template text information.

In addition, the AI server 14 may use the current position of the automobile or a relation between the current position of the automobile and a destination such as home and workplace of the user when generating an electronic mail, In other words, the user may register information regarding a predetermined destination in advance, and store information of the current position of the automobile received from the automobile position display device at a predetermined timing. The AI server 14, which is provided with text information generation rules, may read out these position information at a timing of the generation of an electronic mail, and automatically generates the main text of an electronic mail by utilizing ECU information regarding the automobile and its driving or template text information.

The AI server 14 may periodically communicate with the mail software of the anthropomorphized automobile, obtain the ECU information of the automobile, process the obtained information, generate an electronic mail, and may also send a character essence. The AI server 14 may select information in accordance with user's hobby and preference and sends the selected information to the user. In addition, the AI server 14 may analyze characteristics of driving of the driver and warn him or her with the analyzed result.

Although the AI server function may be installed in an automobile onboard terminal (that will be described later), the AI server function is installed outside the automobile, namely on the network to accomplish more complicated processing in the present embodiment.

In addition, the AI server 14 automatically collects various types of information during driving and generates a drive diary. Moreover, the AI server 14 processes the drive diary on the Web, generates an original homepage, and connects the automobile to a home, office or the like of the user by a service which the user may enjoy. In other words, the AI server 14 obtains information about the automobile itself and its driving from the automobile, generates text information based on template text information and rules for generating text information, and publishes the generated text information as a homepage at a predetermined URL address. When publishing such a drive diary on the Web, the AI server 14 may generate the drive diary based on a relation between the current position of the automobile and the destination such as home, workplace or the like of the driver. With pictures captured during the driving, the drive diary with pictures may be provided by the AI server 14.

Figure 2:
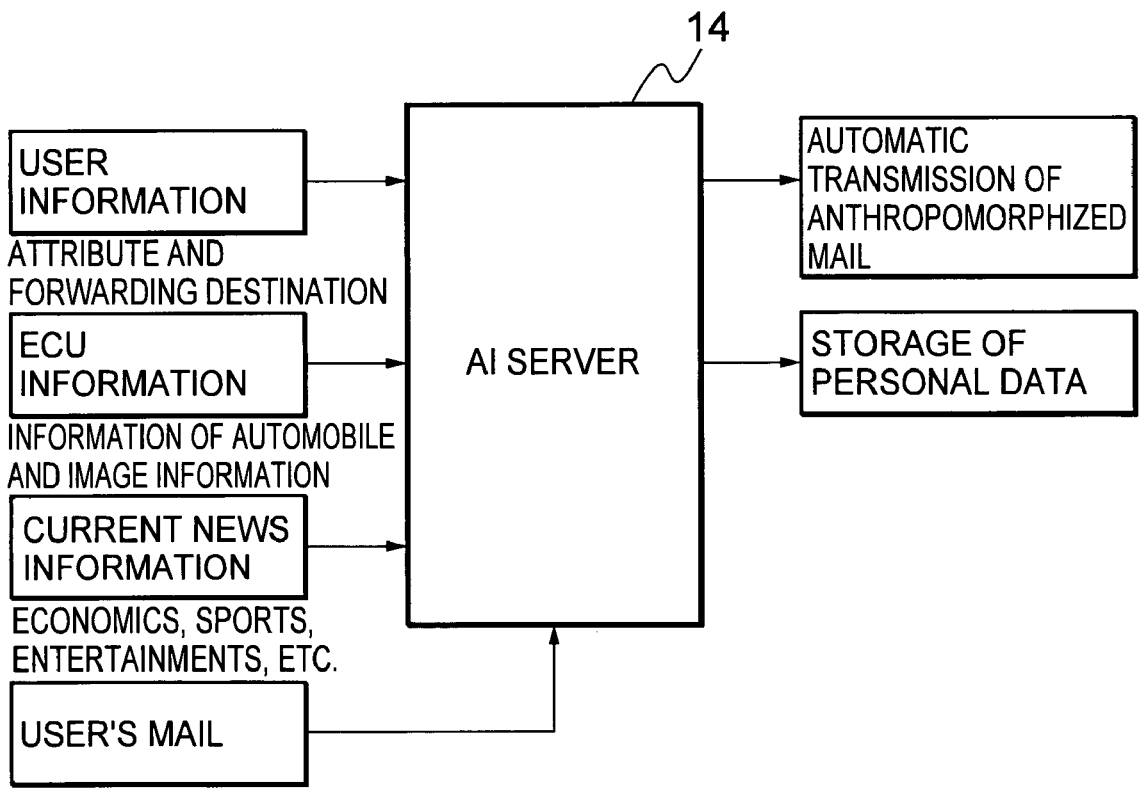
FIG. 2 is a schematic diagram showing a functional structure of an AI server 14.

FIG. 2 schematically shows a functional structure of the AI server 14.

The AI server function itself is realized by executing an AI server application on a typical computer system such as a personal computer.

Data such as user information, ECU information about the automobile, current news information, user mail and so forth are inputted into the AI server 14.

In the present embodiment, the user information may include information about the anthropomorphized automobile in addition to information about a real user such as a driver or an owner of the automobile. Further, the user information may include a forwarding mail address as well as attribute information such as a name and gender of the user that are inputted when an account for a community is obtained.

The ECU information may include sensor information obtained from sensors installed at various parts of the automobile and, for example, forwarded from the automobile by using a wireless communication function after the sensor information are collected by the automobile onboard terminal. Alternatively, the ECU information may be obtained by using a wired communication function that is connected at a time when the automobile is stopped, or may be obtained by using a portable authenticating medium such as an IC card. The ECU information may contain driving information such as fuel level, travel distance, travel speed and position information, and may further include automobile's interior temperature, wiper operation status. Still further, the ECU may include information of pictures captured automatically or manually during the traveling.

The current news information may be information such as politics, economics, sports, entertainment, finance, local event information and so forth, which may be updated from time to time. The current news information is retrieved from external content providing servers (not shown in the figure) through the wide area network. Alternatively, the information retrieval may be performed to obtain current news information that matches user's interests and meets driving condition by composing a retrieval query in accordance with a user profile and a driving situation measured by the ECU information. A processing procedure for generating the anthropomorphized automatic transmission mail with the current news information using the AI function will be described later.

The user mail may include mails received from other anthropomorphized automobiles and mails received from the real user such as the driver or an owner of the automobile.

In addition, the AI server 14 may store personal data of the driver (owner) of the automobile or personal data about the anthropomorphized automobile on the basis of the foregoing input data, and automatically transmit a mail of the anthropomorphized automobile.

The personal data may include driving history, driving characteristics and the like obtained by analyzing the ECU information as well as the attribute information inputted when the user obtains his/her account for a community.

A mail of the anthropomorphized automobile may contain not only real information such as the ECU information that is obtained from the automobile, but may also include a character essence. The current news information may be obtained from contents providing servers, and the current news information may be selected in accordance with user's hobby and preference (namely, performing filtering by utilizing the user profile, etc.), and sends the selected information to the user whenever it is necessary. In addition, driving characteristics of the driver may be analyzed in accordance with the obtained ECU information and used to warn the driver based on the analyzed result.

In the information providing system 1 according to the present embodiment, an automobile onboard terminal is installed in the automobile for enabling the automobile to access the community through the authenticating server 13.

The community server 11 assigns a mail address to an automobile. Further, the community server 11 provides an entry that allow changing of the user information in addition to the assigning of the mail address.

The automobile onboard terminal collects the sensor information from the sensors installed in various parts of the automobile and automatically transmits the collected sensor information as the ECU information to the AI server 14 using a wireless communication function. Alternatively, the sensor information may be transmitted to the AI server 14 using a wired communication function that is connected when the automobile stops or a portable authenticating medium such as an IC card. The AI server 14 performs a process for anthropomorphizing an automobile based on a mail automatically transmitted from the automobile. In addition, the AI server 14 generates a drive diary based on information received from the automobile, and publishes the drive diary as a homepage at a predetermined URL address.

Figure 3:
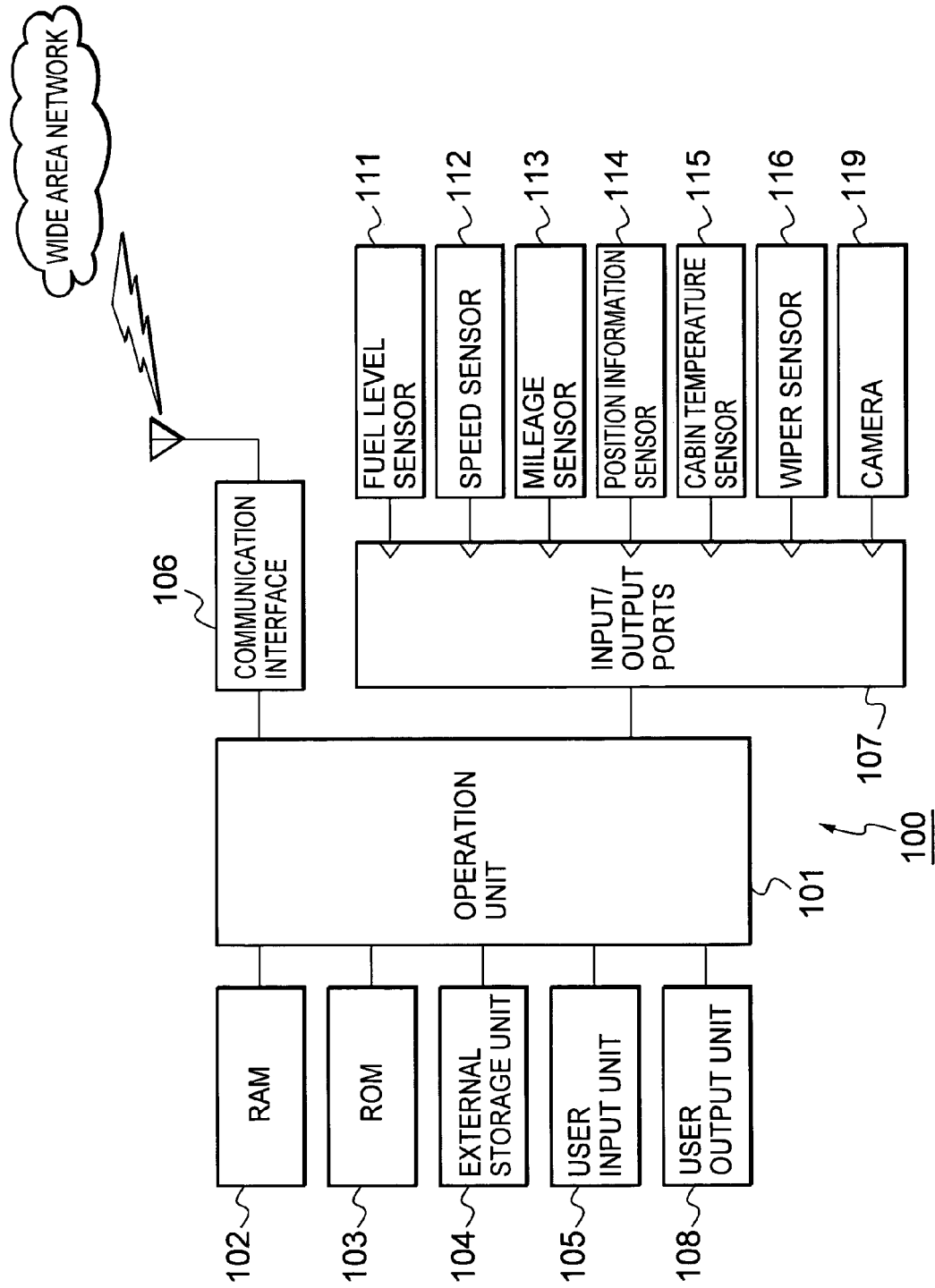
FIG. 3 is a schematic diagram showing a structure of an automobile onboard terminal 100.

FIG. 3 schematically shows a structure of an automobile onboard terminal 100.

The automobile onboard terminal 100 may be configured on the basis of an architecture of a typical computer system. The automobile onboard terminal 100 includes an operation unit 101, such as a Central Processing Unit (CPU), for that executes processing program, a Random Access Memory (RAM) 102 that is used as a working area for processing a program, a Read Only Memory (ROM) 103 that permanently stores the processing program and other data, a Hard Disk Drive (HDD) 104 as an external storage device, an user input/output device 105 and a communication interface 106, etc. In the example shown in FIG. 3, although the communication interface 106 is described as a wireless communication interface, the present invention is not limited to that. Instead, the communication interface 106 may be a wired communication interface.

In addition to the control program for controlling a driving and an interior environment (air conditioning and so forth) of an automobile, an operation unit 101 may execute a program for collecting the ECU information from the automobile and an automatic mail transmission program for transmitting the collected result of the ECU information to an external host terminal such as the AI server 14.

Further, the automobile onboard terminal 100 may be provided with a data input/output port 107 for inputting results measured by the sensors installed at various parts of the automobile, as the ECU information.

A fuel level sensor 111, installed in a fuel tank, measures the amount of remaining fuel in the fuel tank and to inform the automobile onboard terminal 100 of the measured remaining amount of fuel through the data input/output port 107.

A traveling speed sensor 112 calculates the current traveling speed of the automobile in accordance with a rotational speed of axle (or measure the traveling speed in another method), and informs the automobile onboard terminal 100 of the measured traveling speed through the data input/output port 107.

A mileage sensor 113 time-integrates, for example, the measured traveling speed (or measure the mileage in another method), and informs the automobile onboard terminal 100 of the measured traveled distance through the data input/output port 107.

A position information sensor 114 uses, for example, a Global Positioning System (GPS) to obtain the current position of the automobile, and informs the automobile onboard terminal 100 of the current position thereof through the data input/output port 107.

A cabin temperature sensor 115 is installed inside the automobile. The cabin temperature sensor 115 measures an interior temperature of the automobile to inform the automobile onboard terminal 100 of the measured temperature through the data input/output port 107.

A wiper sensor 116 operates in conjunction with an on/off switch of a wiper, and informs the automobile onboard terminal 100 of the operation status of the wiper through the data input/output port 107.

A camera 119 is directed to outside scenery or passengers in the automobile, and captures automatically or manually during traveling.

Alternatively, the automobile onboard terminal 100 may be adapted to obtain the ECU information from sensors other than the foregoing sensors.

The operation unit 101 collects the ECU information through the data input/output port 107 and generates a mail that describes the ECU information, namely, events that have taken place in the automobile. The operation unit 101 automatically transmits the mail to the AI sensor 14 through the wireless interface.

Figure 4:
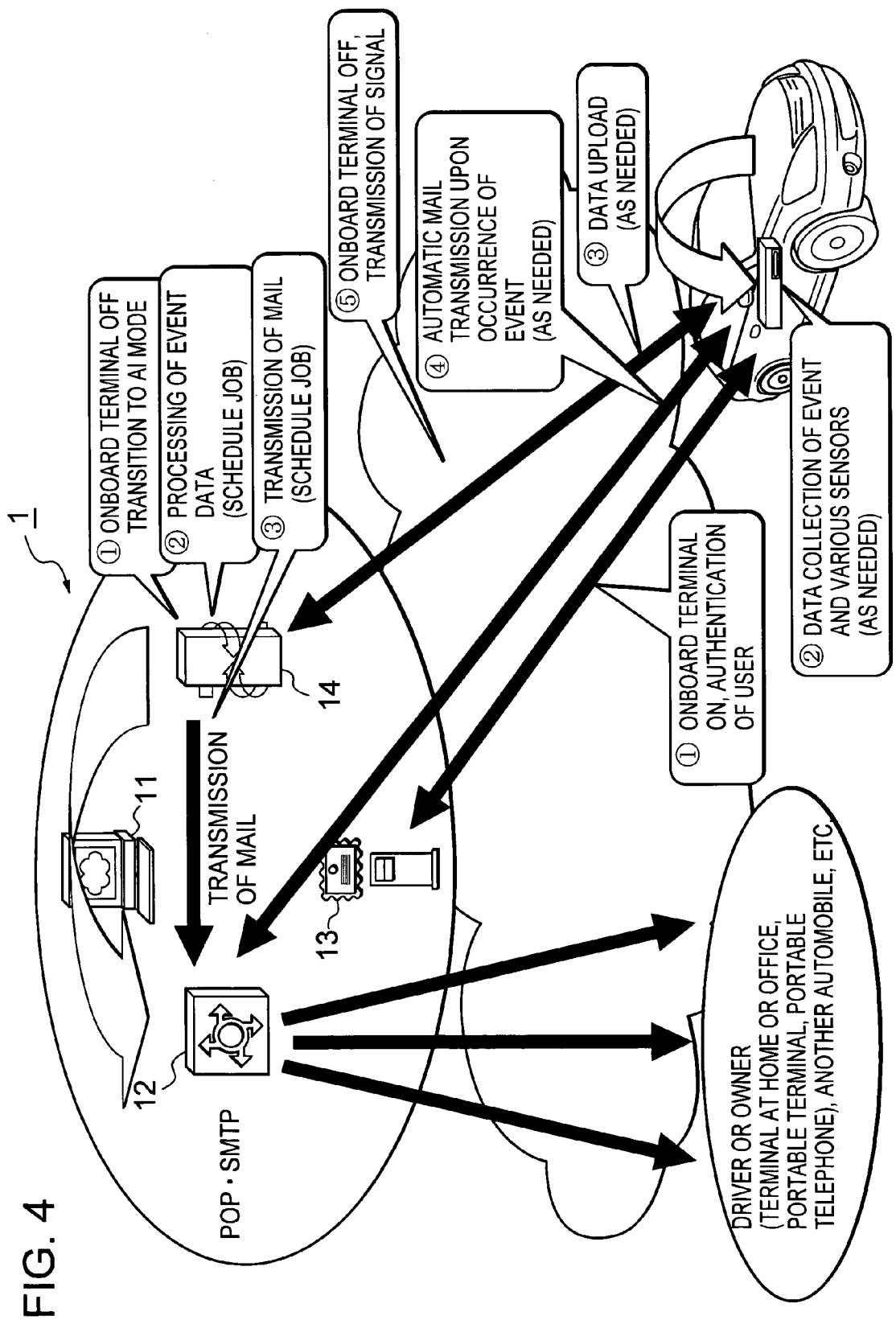
FIG. 4 is a schematic diagram showing a mechanism of a mail exchanging service of an automobile provided by an information providing system 1 according to an embodiment of the present invention.
Figure 5:
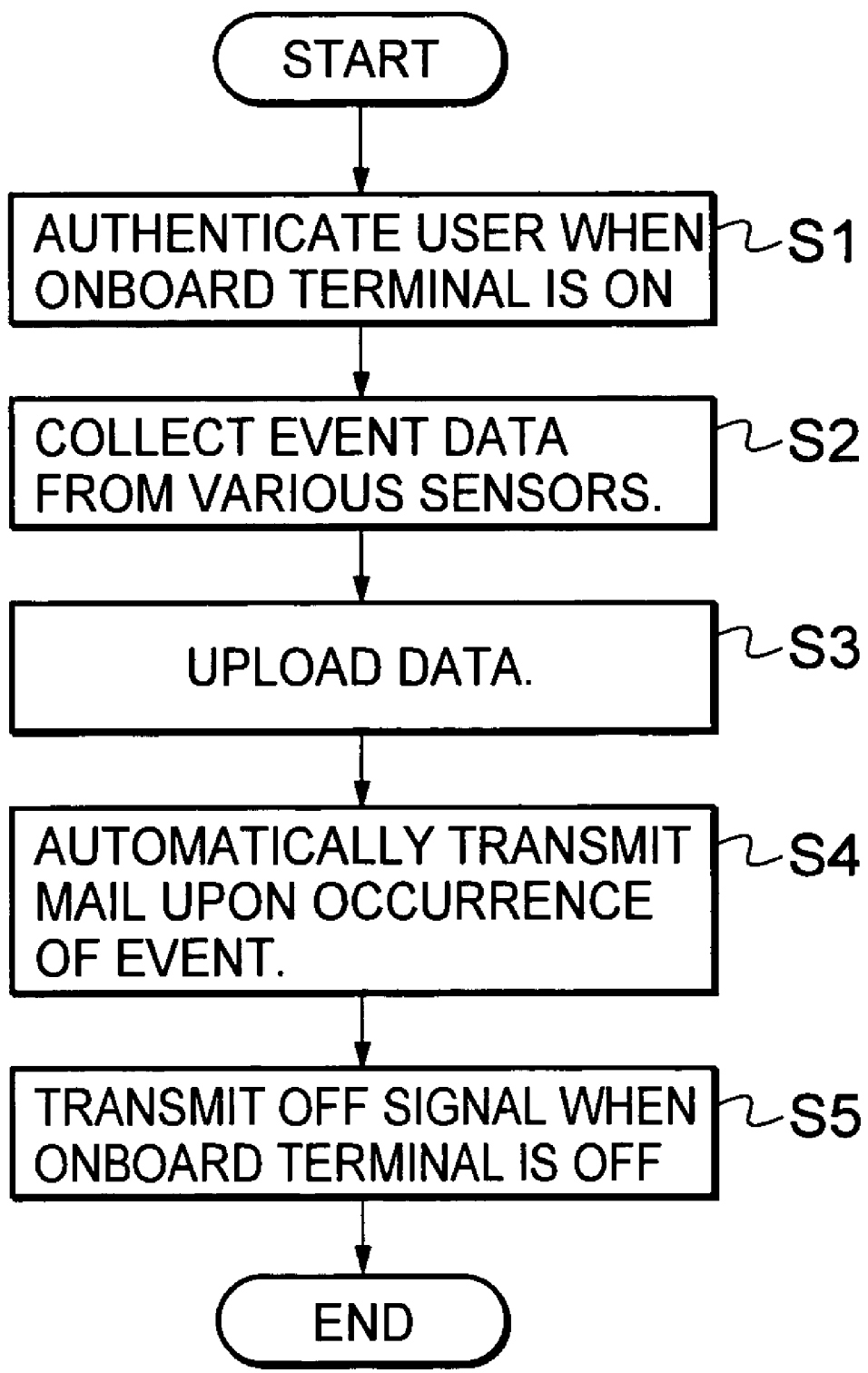
FIG. 5 is a flow chart showing processing procedure on the side of an automobile onboard terminal 100 for realizing a mail exchanging service of an automobile.
Figure 6:
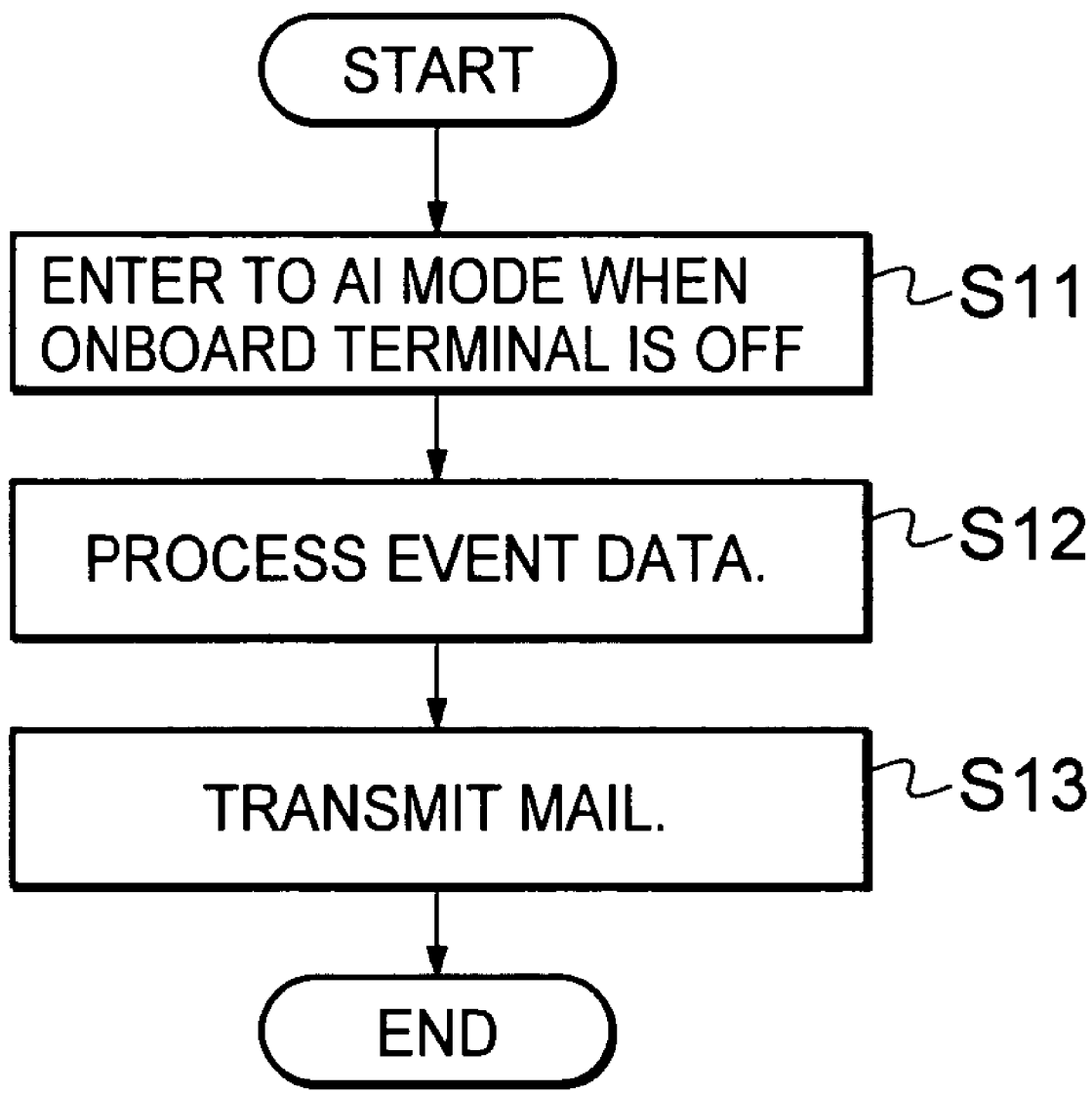
FIG. 6 is a flow chart showing processing procedure on the side of AI server 14 for realizing a mail exchanging service of an automobile.

FIG. 4 shows a mechanism of the mail exchanging service for automobiles provided by the information providing system 1 according to the present embodiment. FIG. 5 and FIG. 6 are flow charts showing processing procedures performed on the automobile onboard terminal 100 and the AI server 14, to realize the mail exchanging service for automobiles.

When an engine of an automobile is started, the automobile onboard terminal 100 is activated. At that point, the automobile onboard terminal 100 accesses the authenticating server 13 through the wireless communication interface 106. After the authenticating server 13 authenticated the automobile onboard terminal 100, the automobile onboard terminal 100 logs in the community (step S1). Alternatively, in view of cost saving for more practical case, the ECU information and so forth may be kept stored in the automobile onboard terminal 100 after the automobile onboard terminal 100 is turned on, and may be transmitted to the AI server 14 when the engine is stopped, whereby completing the processing procedure of the mail exchanging service.

Next, the automobile onboard terminal 100 obtains event data from the foregoing sensors installed in various parts of the automobile and captured picture images through the data input/output port 107 at a predetermined period or arbitrary timing (step S2).

In addition, the automobile on board terminal 100 uploads data to the AI server 14 as needed (step S3).

The operation unit 101 generates a mail describing the event data, namely, the ECU information obtained through the data input/output port 107, and automatically transmits the generated mail to the AI server 14 (step S4).

After the engine of the automobile is stopped, the automobile on board terminal 100 executes a predetermined power off sequence, completes the procedure, and transmits a signal representing that the automobile onboard terminal 100 is shut down to the AI server 14 (step S5).

On the other hand, in conjunction with the shutting down of the automobile onboard terminal 100, the AI server 14 enters the AI mode in which the AI server 14 performs a process for anthropomorphizing the automobile (step S11).

Next, the AI server 14 processes the ECU information, namely, the event data that have taken place in the automobile, from the mail received from the automobile onboard terminal 100 (step S12).

The AI server 14 has text information generating rules, which serve as templates, and generate a mail of the anthropomorphized automobile by selecting an appropriate template, adding a character essence to the selected template, and selecting current news information in accordance with the user's hobby and preference (step S13). The AI server 14 automatically transmits the mail of the anthropomorphized automobile to the driver (owner), other users, or other anthropomorphized automobiles through the mail server 12.

In addition to the generation of the anthropomorphized automobile's mail, the AI server 14 automatically generates a drive diary containing captured pictures.

As the way described above, the AI server 14 automatically distributes a report describing a driving situation along with current news information that would attract a user. Alternatively, the AI server 14 may publish the drive diary on the community server 11 or at a predetermined URL address. Below, some examples of such messages are described.

(1) Baseball Fan Version:

"It is dangerous to drive so fast. Giant's loss will not be good excuse! The highest speed was 130 km per hour. Remaining gasoline is 20 liters. Traveled distance is 50 km."

"Today, ○△◇ hits a home run again! Today, traveled so faraway. Traveled distance is 220 km. Remaining gasoline is 10 liters."

(2) Town Information, Event Version:

"It wasn't so crowded despite of today's fireworks. Traveled distance is 30 km. Remaining gasoline is 25 liters."

"Tomorrow, there will be an open-air concert of ○△◇. Surroundings of the dome will be crowded! Traveled distance is 0 km. Remaining gasoline is 25 liters. Please do not forget to fill me up."

(3) Golf Version:

"Played a different course today, didn't you? How was the score? Traveled distance is 100 km. Gasoline is 5 liters. Would you please fill me up, tomorrow."

"You took a different route. It took longer time. Traveled distance is 100 km. Remaining gasoline is 25 litters."

Figure 7:
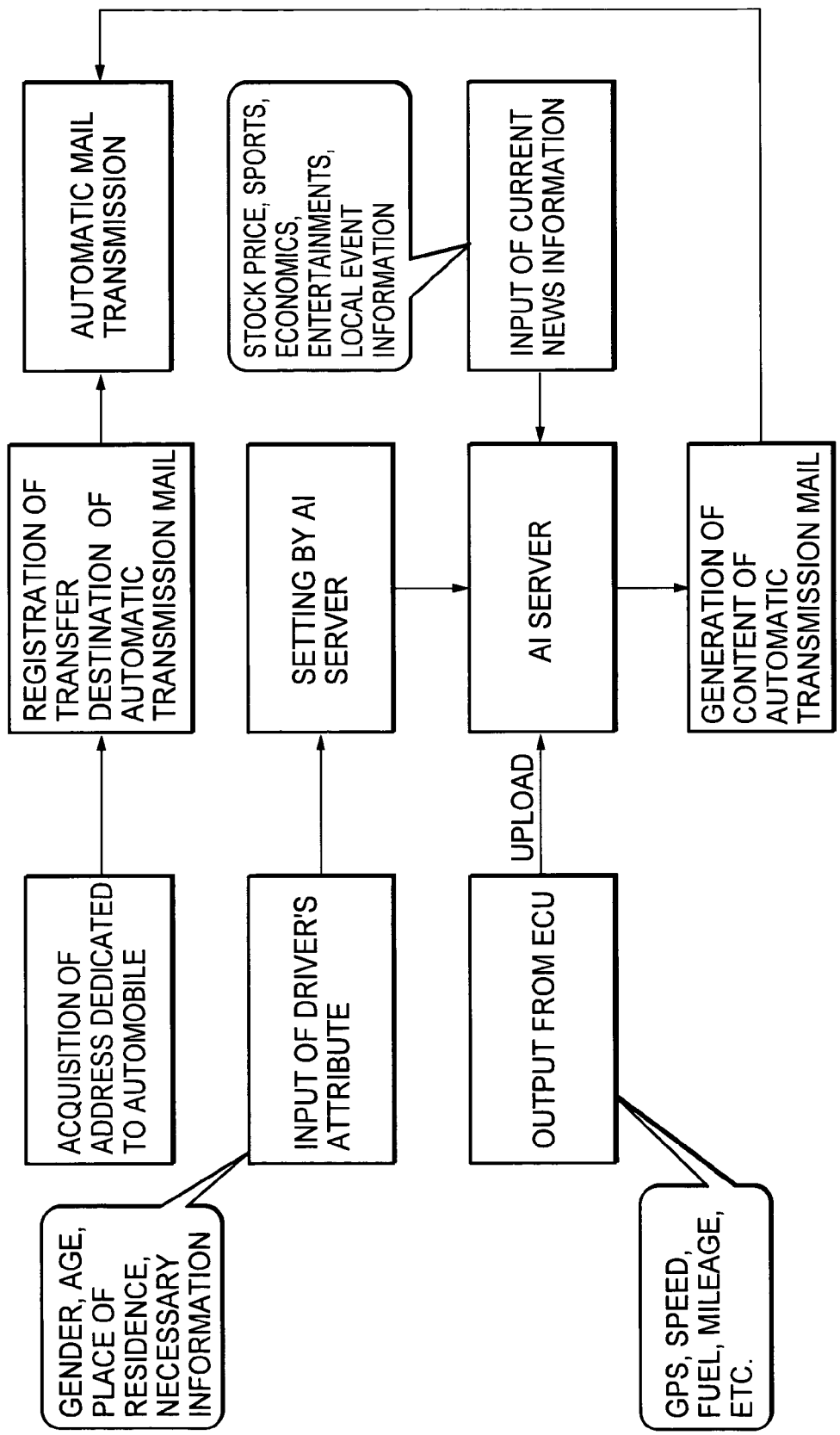
FIG. 7 is a functional block diagram showing a structure for realizing an automatic transmission of anthropomorphized mail in an automobile.

FIG. 7 schematically shows a functional structure for automatically transmitting a mail of an anthropomorphized automobile.

As a pre-processing procedure, a mail address dedicated to the automobile is obtained and a forwarding address of the automatic transmission mail is registered. These pre-processing are executed for example when the automobile obtains an account of the community. When the automobile onboard terminal 100 obtains the mail address, the anthropomorphizing may be performed. The forwarding destinations of the automatic transmission mail may include, for example, a terminal at home or office of the driver or owner of the automobile, other users, and other anthropomorphized automobiles.

Further, the real user such as the driver (or owner) of the automobile inputs attribute of the driver to the information providing system 1. The inputting procedure may be performed, for example, when the user obtains the account of the community. The AI server 14 is set in accordance with the driver's attribute information that has been inputted.

By the setting of driver's attribute information, the AI server 14 is capable of retrieving information with a retrieval query corresponding to the driver's attribute information that has been set at the time of the retrieval of current news information, selecting current news information and processing the ECU information in accordance with the driver's attribute information at the time of generation of the mail of the anthropomorphized automobile.

When the AI server 14 receives the automatic transmission mail of the ECU information from the automobile onboard terminal 100, the AI server 14 selects current news information, processes the ECU information, and generates contents of the mail of the anthropomorphized automobile in accordance with driver's attribute information.

Thereafter, the AI server 14 refers the destination of the automatic transmission mail that has been registered as described above, and performs the automatic main transmitting process.

The AI server 14 recognizes driving status of the driver in accordance with the ECU information received from the automobile onboard terminal 100 and sends a message to the automobile onboard terminal 100. In the present embodiment, by combining a message with current news information at the time of a generation thereof, the AI server 14 may provide comical communications or entertaining communications.

Figure 8:
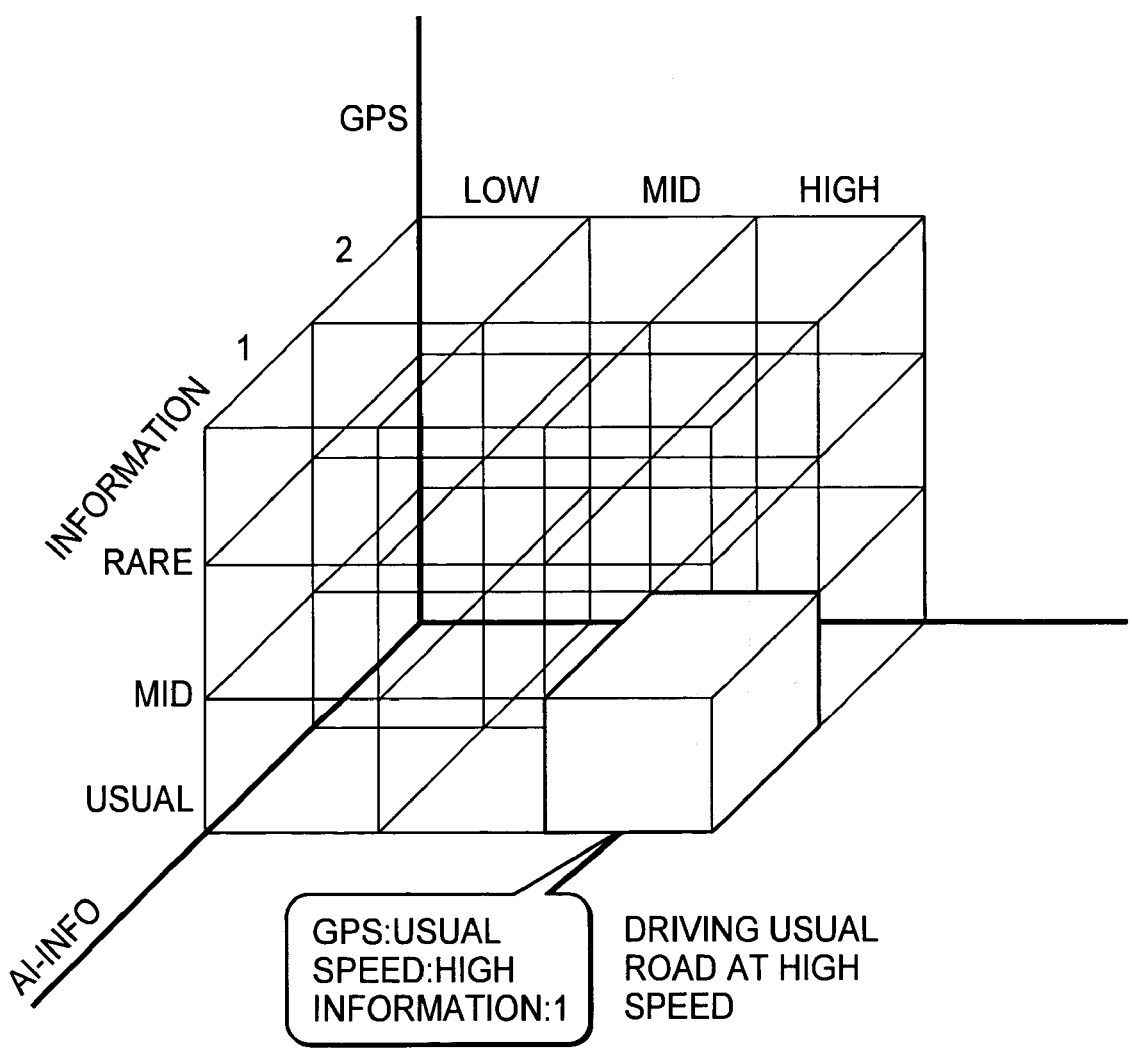
FIG. 8 is a schematic diagram showing a structure of a status matrix that is used for preferably combining messages and current news information.

The AI server 14 uses a status matrix shown in FIG. 8 so as to suitably combine messages and current news information. The status matrix is composed of three dimensions of AI information (AI-info), traveling speed (speed), and position information (GPS). The status is specified based on three dimensional coordinates specified in accordance with the ECU information, etc. Alternatively, the status matrix having four or more dimensions may be used.

FIG. 12 is a flow chart showing processing procedure by which the AI server 14 generates the automatic transmission mail of the anthropomorphized automobile with using current news information.

The AI server 14 obtains various types of current news information from content servers (not shown in the figure) using an information providing system such as the WWW structured on the Internet. The current news information may include entertainment information composed of fan club information, artist information, and so forth, politics and economics information relating to terrorism, diplomacy, business profits, and so forth, financial information composed of stock prices and foreign exchange data, and sports information composed of game results of baseball and soccer, and so forth.

The AI server 14 filters the current news information and extracts necessary information therefrom in accordance with the personal attribute information.

Furthermore, the AI server 14 appropriately combines a message and current news information by utilizing the position information of the automobile, traveled distance, traveling speed, and other driving information obtained from the ECU information. In this case, the status matrix shown in FIG. 8 may be used.

Next, the AI server 14 performs the automatic mail transmission process by referring the destination of the automatic transmission mail that is registered in advance.

In addition to communications mainly for exchanging mails with the anthropomorphized automobiles described with reference to FIG. 4 (Mail Communication), the information providing system 1 performs communications on the basis of the anthropomorphized automobile (Car communication).

Figure 9:
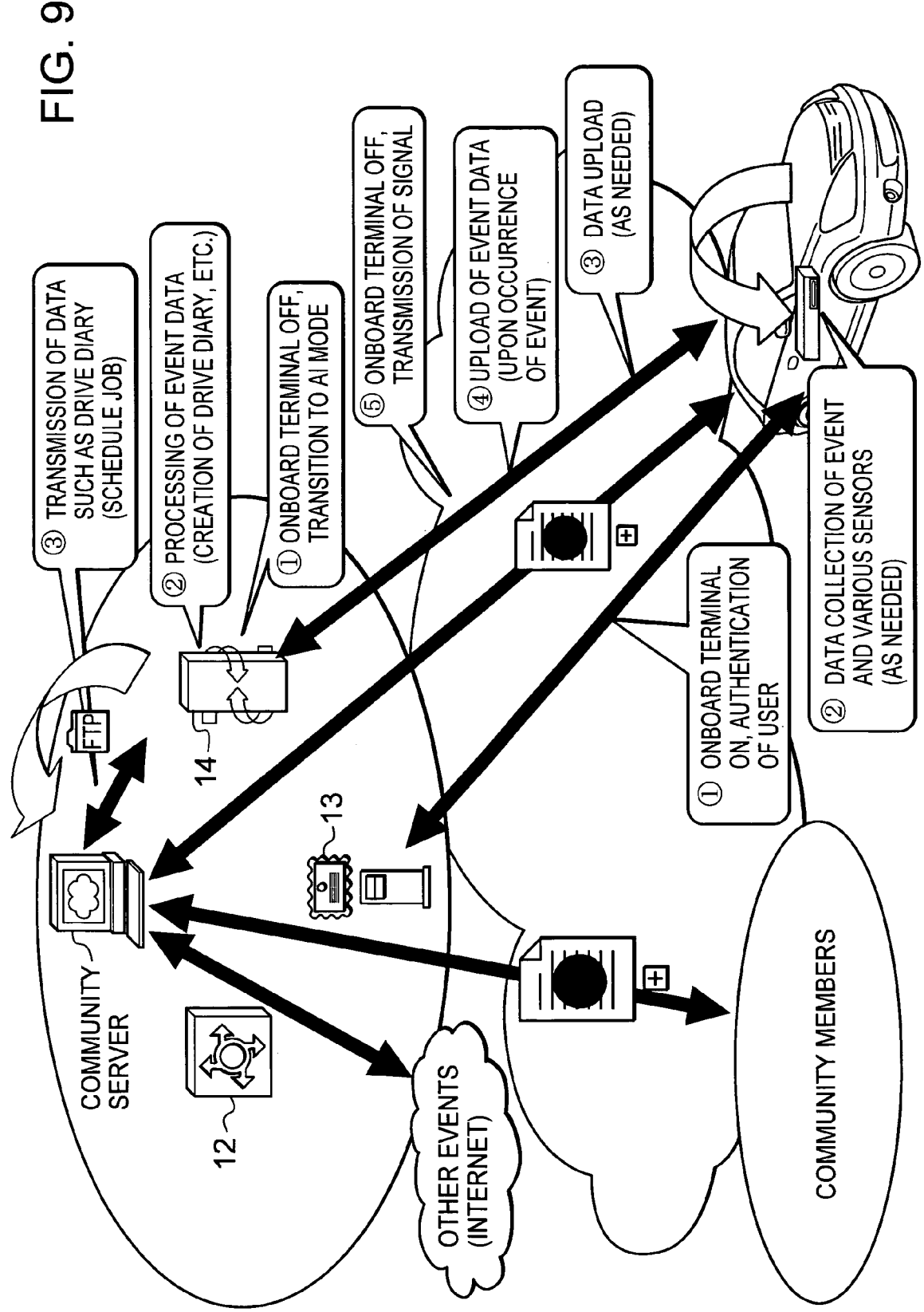
FIG. 9 is a schematic diagram showing a mechanism of a mail exchanging service of an automobile provided by an information providing system 1 according to an embodiment of the present invention.
Figure 10:
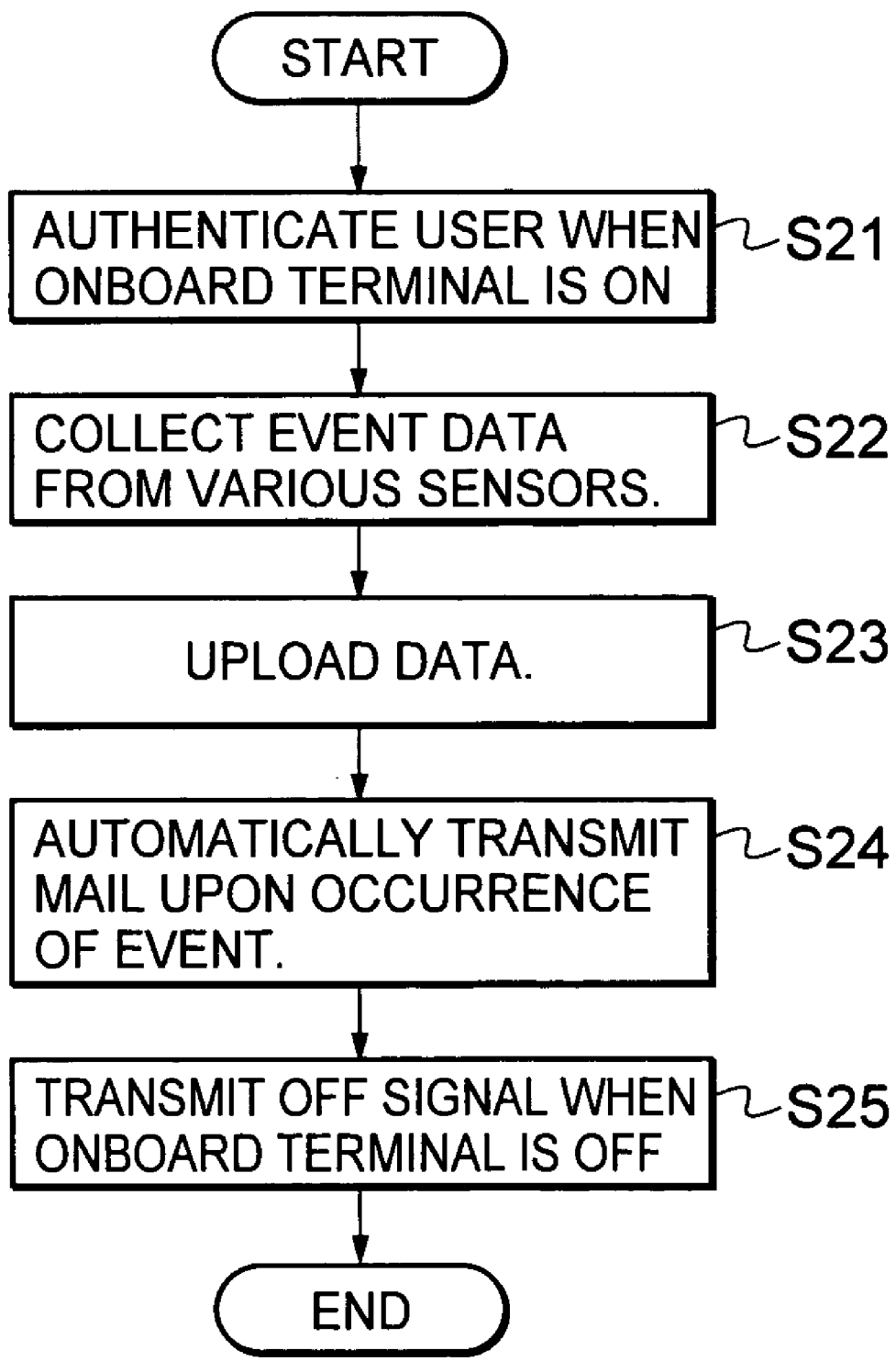
FIG. 10 is a flow chart showing processing procedure on the side of an automobile onboard terminal 100 for realizing an anthropomorphized automobile based communication.
Figure 11:
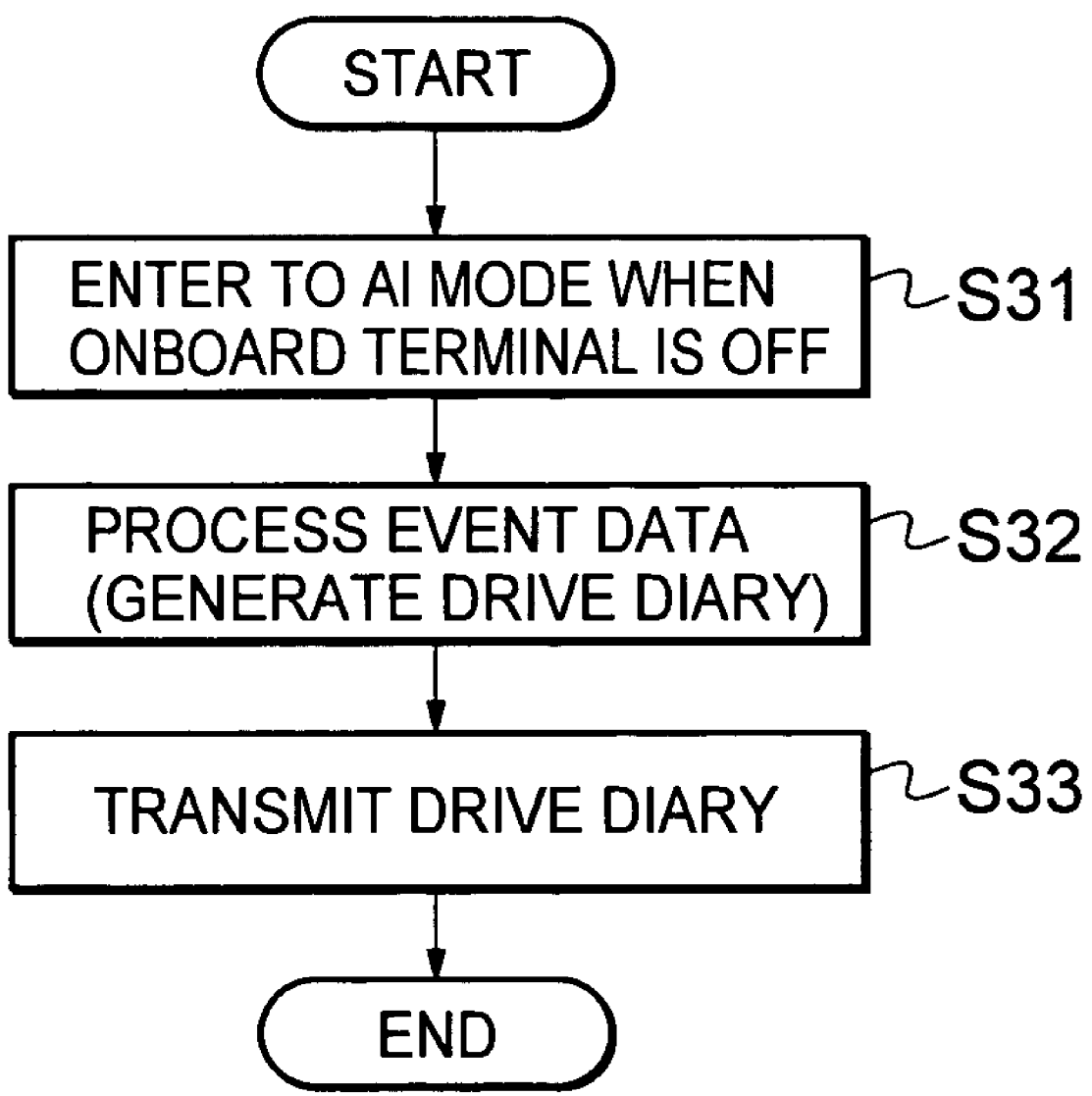
FIG. 11 is a flow chart showing processing procedure on the side of AI server 14 for realizing an anthropomorphized automobile based communication.

FIG. 9 shows a mechanism of the Car Communication. FIG. 10 and FIG. 11 are flow charts showing procedures by which the automobile onboard terminal 100 and the AI server 14 performs the Car Communication.

When an engine of the automobile is started, the automobile on board terminal 100 is activated. The automobile onboard terminal 100 accesses the authenticating server 13 through the wireless communication interface 106. After the authenticating server 13 has authenticated the automobile onboard terminal 100, the automobile onboard terminal 100 logs in the community (step S21).

Next, the automobile onboard terminal 100 obtains event data from the foregoing sensors installed in various parts of the automobile through the data input/output port 107 at a predetermined period or arbitrary timing (step S22).

Further, the automobile onboard terminal 100 uploads data to the AI server 14 as needed (step S23).

The operation unit 101 generates a mail describing event data, namely, the ECU information obtained through the data input/output port 107 and automatically transmits the mail to the AI server 14 (step S24).

Next, when the engine of the automobile is stopped, the automobile on board terminal 100 executes a predetermined power off sequence, whereby completing the procedure, and transmits a signal representing that the terminal 100 is shut down to the AI server 14 (step S25). Alternatively, in view of cost saving for more practical case, the ECU information and so forth may be kept stored in the automobile onboard terminal 100 after the automobile onboard terminal 100 is turned on, and may be transmitted to the AI server 14 when the engine is stopped, whereby completing the processing procedure of the mail exchanging service.

On the other hand, in conjunction with the shutting down of the automobile on board terminal 100, the AI server 14 enters the AI mode in which the AI server 14 performs a process for anthropomorphizing the automobile (step S31).

Next, the AI server 14 processes the ECU information, namely, the event data that have taken place in the automobile, from the mail received from the automobile onboard terminal 100 (step S32).

Next, the AI server 14 analyzes the received event data and generates the drive diary in accordance with various types of information that has taken place during the driving (step S33).

Furthermore, the AI server 14 is capable of processing the drive diary on the Web and generating the original homepage with the processed drive diary. The AI server 14 may upload the generated original homepage to the community server 11 and publish it to community members consisting of the drivers of the automobiles, the anthropomorphized automobiles, etc.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information providing system, comprising:
 means for obtaining vehicle information about a vehicle and driving information about driving by a driver of the vehicle from the vehicle;
 an information generating database for storing template information and an information generating rule;
 an operation means for generating output information based on the vehicle information, the driving information, the template information, and the information generating rule; and
 an output means for outputting the output information.

2. A text information providing system, comprising:
 means for obtaining vehicle information about a vehicle and driving information about driving by a driver of the vehicle from the vehicle;
 an information generating database for storing template information and a text information generating rule;
 an operation means for generating text information based on the vehicle information, the driving information, the template information, and the text information generating rule; and
 an electronic mail transmitting means for transmitting an electronic mail comprising the text information to a mail address through a network,
 wherein the mail address corresponds to a user.

3. The text information providing system according to claim 2, further comprising:
 an input means for inputting the mail address; and
 a mail address storage memory for storing the mail address, wherein the operation means generates the text information at a predetermined time.

4. The text information providing system according to claim 2, further comprising:
means for inputting user attribute information;
a user attribute information storing memory for storing the user attribute information; and
a read out means for reading out the user attribute information from the user attribute information storing memory,
wherein the operation means generates the text information further based on the user attribute information at a predetermined time.

5. The text information providing system according to claim 2, further comprising:
means for inputting a current news keyword;
a current news keyword storing memory for storing the current news keyword;
a read out means for reading out the current news keyword from the current news keyword storing memory; and
means for obtaining current news information, at a first predetermined time, based on the current news keyword,
wherein the operation means generates the text information further based on the current news information at a second predetermined time.

6. The text information providing system according to claim 2, further comprising:
means for receiving current position information from a position system of the vehicle;
a storing memory for storing the current position information; and
a read out means for reading out position information from the storing memory,
wherein the operation means generates the text information further based on the position information.

7. The text information providing system according to claim 2, further comprising:
means for receiving current position information from a position system of the vehicle;
a first storing memory for storing the current position information;
means for inputting predetermined position information;
a second storing memory for storing the predetermined position information; and
read out means for reading out position information from the first storing memory and reading out the predetermined position information from the second storing memory,
wherein the operation means generates the text information further based on the position information and the predetermined position information.

8. An information providing system, comprising:
means for obtaining vehicle information about a vehicle and driving information about driving by a driver of the vehicle from the vehicle;
an information generating database for storing template information and a text information generating rule;
an operation means for generating text information based on the vehicle information, the driving information, the template information, and the text information generating rule; and
a publishing means for publishing the text information at a predetermined address on an information retrieval space through a network.

9. The text information providing system according to claim 8, further comprising:
means for receiving current position information from a position system of the vehicle;
a storing memory for storing the current position information; and
a read out means for reading out position information from the storing memory,
wherein the operation means generates the text information further based on the position information.

10. The text information providing system according to claim 8, further comprising:
means for receiving current position information from a position system of the vehicle;
a first storing memory for storing the current position information;
means for inputting predetermined position information;
a second storing memory for storing the predetermined position information; and
a read out means for reading out position information from the first storing memory and reading out the predetermined position information from the second storing memory,
wherein the operation means generates the text information further based on the position information and the predetermined position information.

11. The text information providing system according to claim 8, further comprising:
a text and picture information generating database for storing a text and picture information generating rule;
means for capturing a picture at a predetermined time; and
a storing memory for storing the picture,
wherein the operation means generates a homepage picture based on the picture information and the text and picture information generating rule, and
the publishing means publishes the homepage picture at the predetermined address on the information retrieval space.

12. An information providing method comprising:
obtaining vehicle information about a vehicle and driving information about driving by a driver of the vehicle from the vehicle;
retrieving template information and an information generating rule from an information generating database;
generating output information based on the vehicle information, the driving information, the template information, and the information generating rule; and
outputting the output information.

13. A text information providing method comprising:
obtaining vehicle information about a vehicle and driving information about driving by a driver of the vehicle from the vehicle;
retrieving template information and a text information generating rule from an information generating database
generating text information based on the vehicle information, the driving information, the template information, and the text information generating rule; and
transmitting an electronic mail comprising the text information to a mail address through a network,
wherein the mail address is predetermined to correspond to a user.

14. The text information providing method according to claim 13, further comprising:
inputting user attribute information;
storing the user attribute information in a storage memory; and
reading out the user attribute information from the storage memory, wherein the text information is generated further based on the user attribute information.

15. The text information providing method according to claim 13, further comprising:
inputting a current news keyword;
storing the current news keyword in a keyword storage memory;
reading out the current news keyword from the keyword storage memory; and
obtaining current news information, at a predetermined time, based on the current news keyword,
wherein the text information is generated further based on the current news information.

16. The text information providing method according to claim 13, further comprising:
receiving current position information from a position system of the vehicle at a predetermined time;
storing the current position information in a storage memory; and
reading out position information from the storage memory,
wherein the text information is generated further based on the position information.

17. An information providing method comprising:
obtaining vehicle information about a vehicle and driving information about driving by a driver of the vehicle from the vehicle;
retrieving template information and a text information generating rule from an information generating database;
generating text information based on the vehicle information, the driving information, the template information, and the text information generating rule; and
publishing the text information at a predetermined address on the information retrieval space through a network.

18. The text information providing method according to claim 17, further comprising:
storing a text and picture information generating rule in a text and picture information generating database;
capturing a picture at a predetermined time; and
storing the picture in a storage memory;
generating a homepage picture based on the picture, the vehicle information, the driving information, the template information, and the text and picture information generating rule; and
publishing the homepage picture at the predetermined address on the information retrieval space.

19. A computer readable media storing a program for causing a computer to execute a method for providing information to a user, the method comprising:
obtaining vehicle information about a vehicle and driving information about driving by a driver of the vehicle from the vehicle;
retrieving template information and an information generating rule from an information generating database;
generating output information based on the vehicle information, the driving information, the template information, and the information generating rule; and
outputting the output information.

20. A computer readable media storing a program for causing a computer to execute a method for providing information to a user, the method comprising:
obtaining vehicle information about a vehicle and driving information about driving by a driver of the vehicle from the vehicle;
retrieving template information and a text information generating rule from an information generating database;
generating text information based on the vehicle information, the driving information, the template information, and the text information generating rule; and
transmitting an electronic mail comprising the text information to a mail address through a network,
wherein the mail address is predetermined to correspond to a user.

21. The computer readable media according to claim 20, wherein the method further comprises:
inputting user attribute information;
storing the user attribute information in a storage memory; and
reading out the user attribute information from the storage memory,
wherein the text information is generated further based on the user attribute information.

22. The computer readable media according to claim 20, wherein the method further comprises:
inputting a current news keyword;
storing the current news keyword in a keyword storage memory;
reading out the current news keyword from the keyword storage memory; and
obtaining current news information, at a predetermined time, based on the current news keyword,
wherein the text information is generated further based on the current news information.

23. The computer readable media according to claim 20, wherein the method further comprises:
receiving current position information from a position system of the vehicle at a predetermined time;
storing the current position information in a storage memory; and
reading out position information from the storage memory,
wherein the text information is generated further based on the position information.

24. A computer readable media storing a program for causing a computer to execute a method for providing information to a user, wherein the method comprises:
obtaining vehicle information about a vehicle and driving information about driving by a driver of the vehicle from the vehicle;
retrieving template information and a text information generating rule from an information generating database;
generating text information based on the vehicle information, the driving information, the template information, and the text information generating rule; and
publishing the text information at a predetermined address on the information retrieval space through a network.

25. The computer readable media according to claim 24, wherein the method further comprises:
storing a text and picture information generating rule in a text and picture information generating database;
capturing a picture at a predetermined time; and
storing the picture in a storage memory;
generating a homepage picture based on the picture, the vehicle information, the driving information, the template information, and the text and picture information generating rule; and
publishing the homepage picture at the predetermined address on the information retrieval space.

* * * * *